Patented Jan. 31, 1933

1,895,516

UNITED STATES PATENT OFFICE

WILBUR A. LAZIER, OF ELMHURST, DELAWARE, ASSIGNOR TO E. I. DU PONT DE NEMOURS & COMPANY, OF WILMINGTON, DELAWARE, A CORPORATION OF DELAWARE

CATALYTIC PROCESS OF PRODUCING KETONES

No Drawing.   Application filed January 9, 1930.   Serial No. 419,743.

This invention relates to catalytic processes, and more particularly to processes for the dehydrogenation of secondary alcohols wherein promoted oxide catalysts are employed.

This application is a continuation in part of my copending applications Serial Nos. 100,712, filed April 8, 1926; 115,692, filed June 12, 1926; 278,910, filed May 18, 1928; 280,962, filed May 26, 1928; 285,501, filed June 14, 1928, and 317,119, filed November 3, 1928.

Numerous finely divided metals and metal oxides have been suggested for the conversion of secondary alcohols into ketones (Sabatier, Catalysis in Organic Chemistry, First American Edition 1922, pages 232-242). Considerable attention has been given to the development of methods based upon the use of copper as a catalyst in these reactions, but numerous obstacles have thus far prevented the development of a completely successful process.

Some of these difficulties may be briefly indicated as follows: (1) The dehydrogenation of a secondary aliphatic alcohol is endothermic to the extent of about 12 large calories, making it extremely difficult to supply a sufficient amount of heat to the catalytic mass from the exterior to maintain the catalyst at the required temperature. (2) Copper, while the most desirable catalyst from the standpoint of initial activity and freedom from a tendency to induce side reactions, quickly deteriorates as a result of sintering or of poisoning by impurities present in the gaseous mixture passed over the catalyst. (3) Oxide catalysts, although capable of retaining their activity for long periods, are ordinarily relatively inactive and therefore require the use of much higher temperatures to bring about the same results obtained with copper catalysts. At these high temperatures they have a distinct tendency to cause a certain amount of dehydration of the alcohols simultaneously with dehydrogenation, with the resulting formation of valueless hydrocarbons.

In developing the process which is the subject of this specification, particular attention was given to the preparation of difficultly reducible oxides in a form having a sufficiently high activity to render the resulting composition extremely efficient catalytically. In this development it was found feasible to combine the advantages of high activity and freedom from side reactions of the reduced metals with the long life and freedom from poisoning characteristic of oxide catalysts. As an example of one method of obtaining this result, I may mention the preparation and heating to the decomposition temperature of an oxalate of a dehydrogenating metal, such as zinc or manganese, which is the subject of my copending application Serial No. 100,712, filed April 6, 1926. Zinc oxide and manganese oxide so prepared are markedly superior as regards activity to the same oxides prepared by known methods, for example, by precipitating the hydroxide of the metals and heating.

Another method of increasing the activity of oxide catalysts is to combine the oxides of two or more metals which have different positions in the periodic table of the elements, and therefore different degrees of acidity and basicity, so that in the resulting catalyst composition the different oxides are partially or wholly combined to form loosely bound salts. Such oxide compositions have found extensive use in the high pressure synthesis of liquid organic compounds from gases, but they have not, so far as I am aware, been applied to the dehydrogenation of alcohols. I have found that basic zinc chromate is of particular value for the dehydrogenation of primary alcohols and have described a process involving its use in my copending application Serial No. 285,501, filed June 14, 1928.

I have also found that an especially valuable contact mass for the dehydrogenation of alcohols generally, and secondary alcohols in particular, may be prepared by first forming a double chromate of a nitrogen base, such as ammonia, and a metal capable of catalyzing either hydrogenation or dehydrogenation and igniting the same to its spontaneous decomposition temperature, thus forming a chromite of the metal. In my copending application Serial No. 317,119, filed Nov. 3, 1928, I have described the preparation of zinc chromite catalysts from basic zinc ammonium chromate and copper chromite from basic copper ammonium chromate. I have subsequently found that both of these chromites are highly efficient catalysts for the dehydrogenation of secondary alcohols to form ketones, as in the dehydrogenation of isopropyl alcohol to acetone. Another method of preparation which includes igniting, at temperatures above 600° C., a chromate of a metal containing no nitrogen base is disclosed in my copending application Serial No. 115,692, filed June 12, 1926.

Several contact masses prepared as indicated above are highly efficient dehydrogenation catalysts, but reactions in which they are used are generally accompanied by a certain amount of dehydration of the alcohol vapor undergoing treatment, this dehydration taking place as a secondary or side reaction. I have discovered that the addition to the catalyst composition of small amounts of alkalies or alkali metal compounds exerts a powerful influence in controlling and repressing the formation of olefins in this manner. This is especially true in the formation of ketones by the dehydrogenation of secondary alcohols, which alcohols are especially liable to this form of decomposition.

The effect of sodium carbonate in repressing the dehydration of isopropanol which normally takes place during dehydrogenation under the influence of a zinc oxide catalyst prepared by the thermal decomposition of an oxalate is disclosed in my copending application Serial No. 118,356, filed June 24, 1926, in which I am coinventor with Hugh Stott Taylor. The same protective repressing influence of alkalies has also been found to be effective in preventing the dehydration of isopropanol formed by the hydrogenation of acetone under pressure in the presence of zinc oxide. In my copending application Serial No. 278,910, filed May 18, 1928, I have disclosed the use of potassium carbonate for this purpose.

It is to be noted, however, that none of the above methods involve the use of alkalies with chromite catalysts for repressing dehydration during the catalytic dehydrogenation of an alcohol and this, so far as I am aware, has never been proposed heretofore. Furthermore, the scientific and patent literature fails to disclose the use of promoted oxide for chromite catalyst compositions, regardless of their methods of preparation, for the dehydrogenation of secondary alcohols.

This invention, therefore, has as an object the application of promoted oxide or chromite catalysts to processes for the dehydrogenation of secondary alcohols to produce valuable nitrocellulose solvents or mixtures of solvents. A further object is to provide a process of dehydrogenating either aliphatic or aromatic secondary alcohols with minimum loss of alcohol due to formation of dehydration products. A still further object is to provide a method of repressing undesirable side reactions in dehydrogenation processes. It is also an object of this invention to provide a method of repressing the normal dehydrating characteristics of dehydrogenating chromite catalysts. Another object is to provide a method of balancing the heat of reaction in such processes so as to maintain the catalyst at the required temperature without continually supplying external heat. Other objects will appear hereinafter.

These objects are accomplished by the following invention, a detailed description of which is given below. In its general aspects my invention comprises the application of promoted oxide catalyst compositions to processes for the dehydrogenation of secondary alcohols. In carrying out a given dehydrogenation, the vaporized alcohol, together with air or other oxidizing gas, is passed over the catalyst at an elevated temperature and, for most purposes, at substantially atmospheric pressure. The products of the reaction are separated from the liquid-vapor mixture and the unchanged alcohol recirculated, thus providing a continuous process in which the alcohol is substantially totally converted to ketone or other desired product. In the preferred form of my invention I add to the oxide or chromite catalyst an alkali or alkaline earth metal compound for the purpose of repressing the normal dehydrating effect of the catalyst on the alcohol undergoing dehydrogenation.

I have set forth below several examples of dehydrogenation processes carried out in accordance with my invention, but they are included merely for purposes of illustration and are not to be regarded as limitations.

*Example 1.*—Basic zinc ammonium chromate is prepared by precipitation at ordinary temperature by mixing two molar solutions of zinc nitrate and neutral ammonium chromate. After the precipitate is washed, dried and heated slightly, it decomposes spontaneously with the evolution of heat. The glowing zinc chromite residue is cooled, pressed into tablets and charged into a suitable reaction tube provided with means for supplying heat thereto. The vapor of isopropanol is superheated to 350° C. and passed over the catalyst at approximately atmospheric pressure at the rate of 2 to 10 volumes of liquid alcohol per volume of catalyst per hour. Hydrogen is liberated with the formation of acetone which is then separated from the unchanged alcohol by fractional distillation. At a space velocity of 2, about 30–40% of the alcohol is converted to acetone and about 3–4% to propylene. By treating the ignited zinc chromite with dilute acetic acid to remove any uncombined zinc, a 10% increase in acetone conversion is effected.

*Example 2.*—100 parts of zinc chromite prepared as described in Example 1 is treated with 15 parts of sodium oxalate by wet grinding, after which the mixture is dried and heated to 400° C. in order to decompose the oxalate, forming sodium carbonate. When employed in the dehydrogenation of isopropyl alcohol under the conditions of Example 1, the conversion to acetone is 20–40%, without the format on of more than a trace of propylene or other waste products. Instead of sodium oxalate, sodium or potassium carbonate may be employed as the dehydration repressor with equal success.

*Example 3.*—5 parts by weight of isopropyl alcohol vapor and 1 part of air are mixed and distributed throughout a contact mass prepared from 270 parts of basic zinc ammonium chromate and 14 parts of anhydrous potassium carbonate. When operating under the conditions mentioned in Example 1, a 23.5% conversion of the alcohol to acetone is obtained. The oxygen in the introduced air is entirely consumed with the formation of water, this water-forming reaction generating sufficient heat to thermally balance the endothermic dehydrogenation. The effluent gas contains approximately 45% hydrogen, 45% nitrogen, 5% carbon dioxide, and mere traces of oxygen and propylene. An aqueous distillate is obtained from which the acetone and unchanged isopropanol are readily recovered.

*Example 4.*—A binary mixture of isopropyl alcohol and water, containing 12% by weight of water, is vaporized and passed over a sulphate free zinc chromite catalyst, alkalized with 5% of sodium carbonate at a space velocity of 3, a temperature of 400° C. and at approximately atmospheric pressure. The conversion to acetone is 25% and to propylene only 0.5%.

*Example 5.*—A solution is prepared containing 15 mols of cadmium nitrate, 10 mols of copper sulphate and 75 mols of zinc nitrate in 50 liters of water. To this is added with stirring a solution of 50 mols of neutral ammonium chromate. Ammonia is added to neutrality, after which the granular yellow chromate precipitate containing combined ammonia is washed five times by decantation, filtered and dried. Upon heating to 350–400° C. spontaneous decomposition takes place with the evolution of heat, leaving a porous residue consisting of chromites and oxides of the various base metals. This material is compressed into suitable briquettes and employed for the dehydrogenation of secondary butanol. 50 parts by weight of the alcohol are vaporized and the alcohol vapor is passed over 25 parts of catalyst per hour heated to 325° C. and at approximately atmospheric pressure. The conversion to hydrogen and methyl ethyl ketone is 15–25%, depending upon the efficiency of the heat input and distribution in the apparatus employed. The effluent gas contains less than 1% butylene formed by dehydrogenation of the alcohol.

*Example 6.*—Cyclohexanol prepared by the catalytic hydrogenation of phenol is dehydrogenated to cyclohexanone when vaporized and passed over a copper chromite catalyst at about 250° C. The copper chromite is obtained as a bluish black solid by igniting to its decomposition temperature a double chromate of copper and ammonia prepared by precipitation of a soluble copper salt with neutral ammonium chromate. By passing over the catalyst two volumes of the cyclic alcohol per volume of catalyst per hour at the above temperature, a 40% yield of cyclohexanone is obtained without the formation of phenol or cyclohexane.

The dehydrogenated product may be used as a solvent, or the ketone may be separated as the bisulphite derivative or by other suitable means which will be apparent to those skilled in the art. It is to be noted that, whereas cyclohexanol is a non-solvent for nitrocellulose, the dehydrogenated product, still containing a substantial quantity of unchanged cyclohexanol, dissolves nitrocellulose with avidity.

*Example 7.*—A mixture of isomeric methyl cyclohexanols prepared by the catalytic hydrogenation of crude cresylic acid is vaporized and the vapor passed through a tube furnace containing cadmium chromite heated to 300° C. It is advisable to treat the catalyst with hydrogen at the operating temperature before introducing the alcohol vapor, as such treatment considerably lessens the violence of the reaction at the initial contact. Hydrogen is copiously evolved with the formation of a mixture of isomeric cyclic ketones. The product has an odor reminiscent of camphor and is an excellent solvent for nitrocellulose.

*Example 8.*—100 parts by weight of basic zinc ammonium chromate is impregnated with a solution of 5 parts of anhydrous sodium carbonate dissolved in water. The mixture is dried in an oven and heated to the spontaneous decomposition temperature of the double ammonium chromate, which temperature is somewhat lower than 400° C. The ignited residue is briquetted into tablets of suitable size and charged into a tubular converter where it is heated to 300–350° C. 5 parts by volume of isopropyl alcohol vapor mixed with two parts of air are heated to 300–350° C. by passage through a heat exchanger and preheater and passed over the contact mass at substantially atmospheric pressure and at such a rate that one volume of catalyst comes in contact with from 2 to 5 volumes of liquid isopropanol per hour. The liquid products of reaction are separated by cooling the hydrogen containing gas leaving the zone of reaction. They are then led into a continuously operated distillation column where the acetone formed in the reaction is removed and the unchanged isopropanol returned to injector pumps for repassage over the catalyst. In so operating, acetone is the only liquid product removed from the plant, isopropanol being recirculated until completely converted to acetone. Under favorable operating conditions, there is produced from 30–50 parts by weight of acetone per volume of catalyst per hour.

In the process of commercially dehydrogenating secondary alcohols by my invention, I have found that under suitable conditions it may be advantageous to employ admixtures of air and alcohol vapor. Contrary to experience with primary alcohols, I find that oxygen-containing gases may be employed in dehydrogenating secondary alcohols without appreciable loss of the desired products which, in this case, are the more stable ketones. I, therefore, prefer to pass air into the apparatus along with the vaporized alcohol. The oxygen thus supplied to the zone of reaction, by exothermically combining with the hydrogen produced by dehydrogenation of the alcohol supplies sufficient heat to thermally balance the reaction and maintain the catalyst at the desired operating temperature. By controlling the temperature within suitable limits, no oxidation of the ketones to acids takes place. Furthermore, the air-alcohol vapor ratio may be so adjusted as to give a net heat of reaction of zero.

By a proper method of distributing the gas mixture throughout the catalyst bed the whole may be kept at a uniform temperature without application of external heat, thus effecting a very considerable economy of operation. Furthermore, owing to the high heat of combustion of hydrogen there will always be under conditions of constant temperature control less oxygen used than that necessary to combine with the hydrogen. Therefore, if air is used, the effluent gas will consist of a nitrogen-hydrogen mixture which may be utilized for ammonia synthesis or other purposes requiring a pure diluted hydrogen.

The chromite catalytic bodies derived according to the methods described above show great superiority in catalytic activity as compared with that of similar catalysts prepared, for example, by the usual prior art methods which involve reduction of chromates by heating in a stream of hydrogen.

In addition it has been found that the activity of the chromite catalysts, prepared according to the present invention, may be improved still further if the ignited product is treated to remove the less active substances present which are not combined in the form of chromite and are of low catalytic activity. These undesirable substances may be removed in any suitable way, such as by leaching the calcined product with a weak acid, e. g., acetic acid, in concentrations of about 5–10%.

The preparation of the catalysts, according to the present process, results in the formation of catalytic bodies of great porosity which, after drying, consist of nearly pure, highly stable chromites, substantially free from acid soluble oxides or other substances of low catalytic activity. These catalysts are highly stable and do not lose their activity even after long use in a catalytic process. For instance, zinc chromite which has been prepared as just described and leached with acid prior to its use as a catalyst, is found to contain no additional acid soluble zinc after using the composition in a catalytic reaction. These compositions have the further advantage that they are not affected by high temperatures.

The form in which the catalyst compositions of my invention are used may be varied according to the physical properties of the material and the conditions of operation. Some catalysts are too light and fluffy for direct use as contact masses. I therefore find it generally desirable to bring the catalytic material into suitable granular form by briquetting, or any other available means which does not introduce harmful impurities. In some cases it may be desirable to support the catalyst upon some inert substance having itself no catalytic effect upon the reactions in which it is used.

It is desirable at this point to comment upon the chemical constitution of the catalyst compositions forming the subject matter of the present invention. First, it may be said that the chief dehydrogenating component is a difficultly reducible oxide of a dehydrogenating metal. By the term "difficultly reducible oxide" as here used, I refer to an oxide which remains substantially unreduced to metal at about 400–450° C. in the presence of hydrogen or organic vapors of a reducing character. By the term "dehydrogenating metal" I refer to a metal the oxide of which possesses the property of inducing the dehydrogenation of alcohols and other organic compounds with the substantial exclusion of undesired side reactions, such as dehydration.

In general, it may be said that two types of reactions usually occur during the catalytic dehydrogenation of alcohols; (1) dehydrogenation per se with the formation of the corresponding aldehyde or ketone, depending on whether a primary or secondary alcohol is being treated; (2) dehydration of the alcohol with formation of olefins. Included in the class of metals giving rise to dehydrogenation with substantial exclusion of dehydration, which are hereinafter referred to as dehydrogenating metals, are copper, cadmium, zinc, manganese, lead, tin, and silver. Although I have just indicated that the dehydrogenating metals fall into two groups, it is to be understood that the term "dehydrogenating metal" as used in the appended claims is intended to cover metals falling within either group.

As pointed out above, the active catalysts of this invention are chromite compositions containing chromium compounds in which the chromium is in the trivalent form. However, these compositions, which may be referred to generically as chromites, are not necessarily compounds of definite chemical constitution, since they may contain widely differing proportions of their components. Zinc chromites, for example, are known to contain a varying proportion of zinc oxide and this proportion is dependent on the ratio of zinc to chromium in the compound or mixture of compounds calcined. In other words, I do not wish to be understood as regarding these compositions as definite salts of chromous acid.

Another way of regarding these compositions is in the light of promoted oxide catalysts in which the dehydrogenating component is an oxide of a dehydrogenating metal combined with the more acidic oxide of chromium, which latter, although having little or no activity of itself, yet serves to increase the activity of the dehydrogenating oxide. Thus, zinc chromite may be considered a composition consisting of varying proportions of zinc and chromium oxides in which zinc oxide is the dehydrogenating component and chromium oxide the promoter.

It will be observed that the dehydrogenating oxides named above, i. e., the oxides of zinc, manganese, copper, cadmium, lead, tin, and silver, are rather basic in nature. On the other hand, the usual promoter oxides are acidic in nature and therefore readily form compounds with the dehydrogenating oxides.

Although I have chosen zinc chromite to illustrate the principles of my invention, I do not intend to be limited to the chromites nor to chromium oxide as the promoting component of my catalyst compositions. I may, for example, using the methods above described, form valuable dehydrogenating catalysts by combining an oxide of a dehydrogenating metal with any of the usual promoting oxides, such as those of vanadium, tungsten, titanium, and molybdenum.

Wherever I refer herein to promoted oxide catalyst compositions, it is to be understood that by this expression I wish to include chromite compositions as defined above, especially when regarded as oxide mixtures rather than definite chemical compounds.

In the various embodiments of the present invention, including the various methods of preparing chromite or similar catalytic bodies, any one of the dehydrogenating metals may be used as the more basic element; or, if desired, several of these metals may be used to form mixtures of the desired compounds.

Although I have indicated the use of double chromates of ammonia, chromates of other nitrogen bases may be used; for example, zinc bichromate tetrapyridine, zinc bichromate tetraaniline, or crystalline amine salts which, when heated, behave in an analogous manner and yield valuable zinc catalysts, may be employed.

It will be evident to those skilled in the art that the specific operating conditions, such as space velocities, temperatures, and pressures, may be varied within wide limits within the scope of my invention, depending on the type of reaction catalyzed and the product desired.

In the preparation of ketones, for example, I prefer to operate at atmospheric pressure, but lower pressures may sometimes be employed with advantage, since as a general rule, reduced pressures have a tendency to increase the speed of any reaction in which a gas is given off, such as hydrogen in the dehydrogenation of alcohols. However, operation at reduced pressures generally gives rise to the necessity for special apparatus and may also present other obstacles which render it impractical. On the other hand, high pressures may be used, but inasmuch as they have a tendency to cause condensation of the ketone products formed in the reaction, are to be avoided unless condensed products are desired.

The term "space velocity", as used above, may be defined as the volume of liquid alcohol which is passed over a unit volume of catalyst per hour.

Although the chromite catalyst compositions of this invention are highly efficient in the production of both aliphatic and aromatic ketones and ketonic bodies, in the case of chromites of certain of the dehydrogenating metals which have both dehydrogenating and dehydrating propensities, their efficiency may be increased by addition of substances which partially or substantially totally repress dehydration.

The catalysts described above may be treated with a compound of one of the alkali or alkaline earth metals of groups 1 and 2 of the periodic table, either in the form of their oxides, carbonates, hydroxides, or salts with feeble acids, such as organic acids, for the purpose of repressing the dehydration and thereby making the process more entirely one of dehydrogenation. In particular cases the effect will be almost, if not entirely, total, depending on the nature of the catalyst and the repressor and the quantity of the latter employed. This will vary in particular cases, but is rarely critical as regards quantity. In general I will not employ more than 5% of the alkali compound which may be incorporated into the contact mass by coprecipitation, occlusion during precipitation, impregnation, grinding, or in any other well known manner.

By the terms "repressive agent" or "suppressive agent" I refer to the ultimate or final effects of these added substances and not to any theory or mechanism of operation, or to any explanation of the ionic, molecular, or atomic relationships or groupings on the surfaces of the catalyst, which may or may not favor preferential, selective, or other action whose ultimate effect is the repression referred to. I, accordingly, designate those substances having such repressive or suppressive effects by the general term repressors or repressives, indicating thereby that the action may be either partial or complete in eliminating the dehydrating effects, while I indicate by the term suppressor or suppressive a substantially totally repressive effect. These repressors are neither to be considered components nor constituents of mixed catalysts, neither are they to be considered promotors or activators, although these additional attributes may, in special cases, also be present incidentally.

It will be seen that many valuable products may be obtained by the practice of my invention. It is particularly applicable to the preparation of valuable nitrocellulose solvents, such as the preparation of a ketone by dehydrogenation of a single secondary alcohol, or it may be applied to the treatment of a mixture of several secondary alcohols to give a mixed ketone solvent. Furthermore, inert ingredients such as hydrocarbons may be present in the alcohol dehydrogenated and thus form a part of the resulting solvent mixture. My invention is also useful in the treatment of cyclic alcohols, such as cyclohexanol, to render them solvents for nitrocellulose. As indicated above, although cyclohexanol is a non-solvent, if dehydrogenated, the product dissolves nitrocellulose readily even though containing much unchanged cyclohexanol. Many other applications and advantages of my invention will be apparent to those skilled in the art.

As many apparent and widely different embodiments of this invention may be made without departing from the spirit and scope thereof, it is to be understood that I do not limit myself to the specific embodiments thereof except as defined in the appended claims.

I claim:

1. In the process of dehydrogenating secondary alcohols, the step which comprises passing the vapor of a secondary alcohol in contact with a catalyst composition comprising a difficultly reducible oxide of a dehydrogenating metal and an oxide of a metal belonging to group 6 of the periodic table.

2. The process of claim 1 in which the difficultly reducible oxide is zinc oxide.

3. The process of claim 1 in which the catalyst composition comprises zinc oxide and chromium oxide.

4. The process of claim 1 in which the catalyst is prepared by heating a chromate of a dehydrogenating metal to its decomposition temperature.

5. The process of claim 1 in which the catalyst is prepared by heating a chromate of a dehydrogenating metal and a nitrogen base to its spontaneous decomposition temperature.

6. The process of claim 1 in which the catalyst composition is prepared by heating a chromate of a dehydrogenating metal and ammonia to its spontaneous decomposition temperature.

7. The process of claim 1 in which the catalyst composition contains a compound of an alkali metal which is basic in character under the conditions of the process.

8. The process of claim 1 in which the temperature is maintained in the neighborhood of 250° to 400° C.

9. The process of claim 1 in which the difficultly reducible oxide is zinc oxide, and the temperature is maintained in the neighborhood of 250° to 400° C.

10. The process of dehydrogenating isopropyl alcohol to form acetone, which comprises passing a mixture containing 5 parts by volume of the vaporized alcohol and two parts by volume of air, at a temperature of 300–350° C. at the rate of 2–5 volumes of vapor mixture per volume of catalyst per hour over a catalyst prepared by heating basic zinc ammonium chromate containing 5% anhydrous sodium carbonate to its spontaneous decomposition temperature, separating the acetone formed, and thereafter revaporizing and recirculating the unchanged alcohol over the catalyst to effect a further conversion of said alcohol.

11. In the process of dehydrogenating secondary alcohols, the step which comprises passing the vapor of a secondary alcohol in contact with a catalyst composition comprising zinc oxide, a more acidic metal oxide, and a compound of an alkali metal which is basic under the conditions of the process.

12. The process of claim 11 in which the more acidic oxide is chromium oxide.

13. In the process of dehydrogenating secondary alcohols, the step which comprises passing the vapor of said alcohols over a catalyst composition prepared by heating a chromate of a dehydrogenating metal and a nitrogen base, which also contains a carbonate of an alkali metal, to its spontaneous decomposition temperature.

14. In the process of dehydrogenating isopropyl alcohol, the step which comprises passing the vapor of said alcohol over a catalyst composition prepared by heating a chromate of a dehydrogenating metal and a nitrogen base to its spontaneous decomposition temperature.

15. The process of claim 14 in which the catalyst composition contains a compound of an alkali metal which is basic under the conditions of the process.

16. The process of claim 14 in which the catalyst composition contains a carbonate of an alkali metal.

In testimony whereof, I affix my signature.

WILBUR A. LAZIER.